United States Patent Office 3,758,452
Patented Sept. 11, 1973

3,758,452
DETOXIFICATION AND ISOLATION OF RAPE-
SEED PROTEIN BY AQUEOUS SALINE EX-
TRACTION AND ISOELECTRIC PROTEIN
PRECIPITATION
David F. Owen, 18657 San Fernando Mission Blvd.,
Northridge, Calif. 91324
No Drawing. Filed Dec. 1, 1971, Ser. No. 203,842
Int. Cl. A23j 1/14
U.S. Cl. 260—123.5                                8 Claims

ABSTRACT OF THE DISCLOSURE

A bland, non-toxic rapeseed protein isolate is produced by contacting rapeseed presscake with an aqueous saline extraction medium to extract rapeseed protein from the presscake, isoelectrically precipitating rapeseed protein from the extraction medium, washing the precipitated protein, and spray drying the protein. The spray dried rapeseed protein isolate has a high protein content, is substantially free of toxic material, and is suitable for use in food formulations intended for human consumption. The rapeseed presscake, after extraction, has a low level of toxic materials and is suitable for use as a feed supplement for animals.

BACKGROUND OF THE INVENTION

This invention relates to the preparation of a protein isolate from rapeseed presscake. More particularly, the invention relates to a relatively simple process for the extraction, detoxification and isolation of the proteins of rapeseed presscake to provide a bland, non-toxic protein isolate suitable for use in foods for human consumption.

Rapeseed (Brassica napus and Brassica campestris) has acquired considerable importance in many areas of the world as a source of edible oils. In recovering the oil, rapeseed is generally ground and pressed and/or solvent extracted to remove substantially all of the oil, leaving a defatted meal or presscake. This presscake contains about 30%–40% crude protein (N×6.25), with the protein having a relatively high biological value. Analysis of the amino acid content of the protein in the presscake has indicated that it could be an important source of protein for animal and possible for human consumption.

However, the rapeseed presscake has not been used extensively as a protein source in human or animal nutrition. This is due to the fact that the presscake is contaminated with toxic substances which renders it unsuitable for human and most animal consumption. These toxic substances remaining in the presscake after oil extraction have been identified as thioglucosides (or glucosinolates) which are hydrolyzed by the enzyme mycrosinase to 5-vinyl-2-thiooxazolidone and isothiocyanates, which cause growth retardation and hyperthyroidism. As a result, the use of rapeseed presscake has been limited primarily to feeds for ruminants, for ruminants are least affected by the toxic substances contained therein. Since a world-wide shortage of protein for human consumption seems imminent, and in view of the present low level of protein consumption in many underdeveloped countries, the use of rapeseed presscake for ruminant feed can be considered to be relatively wasteful.

Considerable effort has been directed in recent years to the removal of the toxic substances from rapeseed presscake. However, none of the procedures disclosed heretofore have been entirely satisfactory. In fact, it has been suggested (Can. J. Agr. Sci., vol. 35, page 242, 1955) that the only satisfactory method of counteracting the total effect of the toxic factors is rapeseed presscake is to limit the use of the meal.

SUMMARY OF THE INVENTION

The present invention is directed to a process for providing a bland, non-toxic rapeseed protein isolate from rapeseed presscake, the isolate having a high protein content and being substantially free of toxic substances. The present invention also provides a rapeseed presscake by-product having a low level of thioglucosides and containing a substantial amount of protein so that this by-product is suitable for use as feed for animals, including animals other than ruminants. The process by which this rapeseed protein isolate is produced is relatively simple and can be carried out using a minimum of equipment. Generally, the isolate is produced by contacting rapeseed presscake with an aqueous saline extraction medium to extract protein and toxic substances from the meal, separating the extraction medium from the presscake, precipitating rapeseed protein from the extraction medium while the toxic substances remain in solution, thoroughly washing the protein curd to remove substantially all traces of the thioglucosides in the curd, and spray drying the curd to provide a protein isolate which is light tan in color and is bland and substantially tasteless. The spent presscake recovered after the extraction step has a substantially reduced thioglucoside content and a sufficiently high level of protein to make the spent meal suitable for use in the feeding of domestic animals.

DESCRIPTION OF PREFERRED EMODIMENTS

Referring more particularly to the present process, the rapeseed presscake used in the present invention is obtained by the extraction of oil from rapeseed (B. napus and B. campestris) by an conventional technique such as hydraulic pressing, solvent extraction, or pressing followed by solvent extraction. While the composition of the presscake may vary slightly with the method of oil extraction, it generally contains between about 30%–40% crude protein, with the amino acid content of the crude protein comparing favorably in profile with that of soybean meal. Typically, the presscake contains about 2%–5% thioglucosides.

Protein and thioglucosides are extracted from the presscake meal by contacting the presscake with an aqueous medium containing sodium chloride. Generally, it is preferred that the aqueous medium contain between 2% and 10%, w./v., sodium chloride. While sodium chloride concentrations outside this range may, if desired, be used, concentrations of less than about 2% may be too dilute to enable effiecient extraction of protein from the presscake. Concentrations of greater than 10% have been found to be undesirable since the density of such solutions is too high to permit efficient separation of the spent presscake from the extraction medium.

The pH of the aqueous extraction medium is preferably about 7.0–8.5, but may range from about 6.0 to 10.0. While a pH of greater than 10.0 may be used, it is generally not desired in order to avoid extensive trpytophan loss due to such a high degree of alkalinity. While the extraction medium may be at an elevated temperature, for example about 60° C., it has been found that efficient protein extraction may also be obtained at a temperature of about 5° C. Temperatures between 5°–60° C. may be used.

Any suitable ratio of presscake to aqueous extraction medium may be used in the extraction step. A presscake to water ratio of between about 1:5 to 1:10 (by weight) has been found to be satisfactory. Ratios outside this range may be used if desired.

The presscake meal should be maintained in contact with the aqueous extraction medium for a period of time sufficient to extract a substantial amount of protein from the presscake. This period of time may vary widely and may depend upon a number of factors, such as the particle size of the presscake, the concentration of sodium chloride in the extraction medium, the degree of agitation of the extraction slurry, the pH and temperature of the extraction medium, and the like. A one-hour extraction period is generally satisfactory under most conditions.

According to a preferred embodiment of the invention, the presscake meal is subjected to a particle size reduction step prior to or during the extraction step. Thus, the presscake meal may be contacted with the aqueous saline solution to form a slurry and the slurry passed through any suitable equipment to effect particle size reduction such as, for example, a colloid mill, an impact mill, a hammer mill, and the like. Alternatively, a slurry of the presscake in water may be passed through the equipment and the slurry subsequently diluted by the addition of a sodium chloride-containing solution to effect protein extraction. Subjecting the presscake to such a particle size reduction step not only increases surface exposure of the presscake to the extracting medium to thereby increase protein yield, but also facilitates the handling and pumping of the presscake.

After extraction, the aqueous saline extraction medium, which contains soluble proteins and thioglucosides, is separated from the spent presscake solids by any suitable technique such as decanting, filtering, centrifuging, and the like. The spent solids may be washed with water and the wash water combined with the aqueous extraction medium. The separated presscake solids contain a substantial amount of protein and have a relatively low thioglycoside content. Accordingly, these spent solids may be recovered for use as an animal feed supplement. Alternatively, the spent solids may be admixed with fresh rapeseed presscake for use as starting material in a subsequent protein extraction operation.

Following the separation step, the aqueous saline extraction medium is acidified to a pH of 2.0–4.0, and preferably about 2.5–3.0, to precipitate protein from the aqueous medium at about its isoelectric point. Any suitable acid may be used, such as hydrochloric, lactic, and the like. Rapid addition of the acid to the aqueous medium is generally preferred to promote the formation of large protein curds. The precipitated proteins are then separated from the extracting solution and thoroughly washed, with agitation, to remove thioglucosides, undesirable soluble salts, and excess acid. After each washing, the protein precipitate is allowed to settle and the supernatent liquor is removed by decantation, filtration, centrifugation, or other suitable techniques. The protein curd is washed a sufficient number of times to remove substantially all traces of thioglucosides in the curd and to increase the protein moiety of the isolate to 80% protein or greater. Generally, it is preferred to wash the precipitate at least about five times in order to ensure the complete removal of the thioglucosides. A lesser number of washes may be used if the protein curd is thoroughly agitated with each wash. A greater number of washes may be used if desired but are usually not necessary. Prior to the last wash, it is preferred to add a calcium salt, such as calcium carbonate, to the protein concentrate and to adjust the pH of the concentrate to about 5.5 to 6.0 by the addition of a sodium hydroxide solution. This procedure stabilizes the protein curd and eliminates an acid taste in the final product. After the addition of the calcium salt and sodium hydroxide, the protein curd may be washed several additional times in order to remove residual concentrations of salts from the curd.

When the washing is completed, that is, when substantially no thioglucosides remain in the protein isolate, the isolate is dried by any suitable procedure, such as spray drying, freeze drying, or the like, to provide a protein isolate which is light tan in color, substantially tasteless, and forms a good suspension in a liquid formula-type vehicle. In a typical procedure, the protein isolate is diluted with water to form a slurry containing about 5%–10% solids by weight, which is spray dried.

The protein isolate produced by the process of this invention has a crude protein content (N×6.25) of up to about 88%, a thioglucoside content of essentially zero, and a protein efficiency ratio (PER) of 1.88. When the rapeseed protein isolate of this invention is mixed in equal amounts with spray dried milk solids, the product thus formed has a PER of 2.45. When the amino acid pattern was compared with the FAO provisional amino acid pattern, the rapeseed protein isolate of this invention had a higher value than soybean protein. Toxicity trials with rats for eight weeks using the rapeseed isolate of this invention showed that body composition and organ weights of the test animals were similar to those of rats maintained on a casein control diet. Histological studies showed no alteration in thyroid or liver tissue for rats fed the rapeseed protein isolate of this invention. Infant feeding studies, in which equal parts proteins of spray dried milk and the protein isolate of the present invention were fed, resulted in normal growth.

The following specific example illustrates the invention more fully. This example is for illustrative purposes only and is not intended to limit the scope of the invention in any manner. Unless otherwise indicated, all parts and percentages are by weight.

EXAMPLE

Five kilos of rapeseed presscake meal was slurried with a minimum of 25 liters of tapwater at ambient temperature (5°–10° C.) and the resulting slurry was then passed two times through a colloid mill for reduction in particle size and increased protein extraction from the presscake. The ground slurry was then diluted with water to a volume of 50 liters and transferred to a stirring tank at which time 3 kg. of sodium chloride was added. The resulting slurry was agitated for one hour at ambient temperature and then transferred from the stirring tank into a basket-type centrifuge fitted with a filtration bag. The extraction medium was collected at the liquid outlet of the centrifuge and transferred to a precipitation vat. The extracted presscake solids were washed three times with water, with the wash water being combined with the extraction medium in the precipitation vat. The analysis of the rapeseed press-cake solids, before and after extraction, is set forth in Table 1.

The solution in the precipitation vats, which contained soluble proteins, carbohydrates, minerals and thioglucosides, and had a pH of about 6, was acidified to a pH of 2.5 by the addition of hydrochloric acid diluted 1:1 to precipitate the proteins. The protein curd was allowed to settle until no further settling resulted, about one to two hours. The supernatent liquid was discarded and the protein precipitate was then remixed with a volume of water approximately equal to the discarded supernatent liquid. This procedure was repeated three times, with the protein curd being agitated and allowed to resettle each time. Calcium carbonate was then added to the precipitate in the amount of one gram per 10 liters of precipitated protein and sufficient water was added to the precipitate to bring it to its original volume. The pH of the precipitate was then adjusted to about 6.0 by the addition of 20% sodium hydroxide solution, and the protein curd allowed to settle. The supernatent liquid was siphoned off and the protein curd washed with water. The curd was then centrifuged for 10 minutes while being washed with water equal in volume to the precipitated curd. This procedure was repeated three times.

The washed precipitate was collected and slurried with sufficient water to provide a slurry containing 7% solids by weight. This slurry was then spray dried to provide the rapeseed protein isolated of the present invention.

The analysis of several spray dried isolates produced by the process of this invention is set out in Table 2.

TABLE 1.—ANALYSIS OF RAPESEED PRESSCAKE MEAL

| Material | Weight (kgs.) | Percent Moisture | Percent Protein | Percent Thioglucosides |
|---|---|---|---|---|
| Before extraction | 5 | 9.3 | 35.9 | 3.6 |
| After extraction | 3.25 | 8.4 | 25.8 | 0.97 |

Since the extracted rapeseed presscake has a low level of thioglucosides and contains a substantial amount of protein it is suitable for use as an animal feed supplement.

TABLE 2.—ANALYSIS OF SPRAY DRIED PROTEIN ISOLATE

| Sample number | Moisture (percent) | Crude protein (N×6.25, percent) | Thioglucosides (percent) |
|---|---|---|---|
| 1 | | 84.2 | 0 |
| 2 | 2.19 | 83.6 | 0 |
| 3 | | 81.5 | 0 |
| 4 | 2.09 | 80.8 | 0 |

This analytical data clearly shows that the present process produces a detoxified rapeseed protein isolate having a high protein content.

Various modifications, changes and alternatives can be made in the method of the present invention, its steps, and parameters. All such modifications, changes and alternatives as are within the scope of the appended claims form a part of the present invention.

What is claimed is:

1. A process for producing a non-toxic rapeseed protein isolate which comprises
   contacting rapeseed presscake meal containing soluble proteins and thioglucosides with an aqueous extraction medium containing sodium chloride for a period of time sufficient to extract said proteins and thioglucosides from said presscake,
   separating the extraction medium from the extracted presscake meal,
   acidifying the extraction medium to a pH of about 2.0–4.0 to precipitate proteins therefrom,
   washing the protein precipitate with water, and
   drying the protein precipitate to thereby provide a dried non-toxic rapeseed protein isolate.

2. The process defined in claim 1 in which the aqueous extraction medium contains about 2% to 10% sodium chloride and has a pH of between about 6 and 10.

3. The process defined in claim 1 in which the protein precipitate is washed a sufficient number of times to remove all traces of thioglucosides in the precipitate.

4. The process defined in claim 3 in which the protein precipitate is contacted with a calcium salt and is adjusted to a pH of about 5.5–6.0 during the washing of the precipitate.

5. The process defined in claim 1 in which the presscake meal is subjected to particle size reduction prior to the completion of contact between the presscake and the extraction medium.

6. A method of separating thioglucosides from rapeseed protein contained in rapeseed presscake meal which comprises:
   contacting rapeseed presscake meal containing soluble proteins and thioglucosides with an aqueous extraction medium containing sodium chloride for a period of time sufficient to extract said proteins and thioglucosides from said presscake,
   separating the extraction medium from the extracted presscake meal,
   acidifying the extraction medium to a pH of about 2.0–4.0 to precipitate proteins therefrom while the thioglucosides remain in the extraction medium, and
   separating the precipitated proteins from the extraction medium.

7. The method defined in claim 6 in which the aqueous extraction medium contains about 2% to 10% sodium chloride and has a pH of between about 6 and 10.

8. The method defined in claim 6 in which the precipitated proteins, after separation from the extraction medium, are washed and dried to provide a rapeseed protein isolate substantially free of thioglucosides.

References Cited
UNITED STATES PATENTS

| | | | |
|---|---|---|---|
| 1,755,531 | 4/1930 | Beaufour | 260—123.5 |
| 2,194,867 | 3/1940 | Olcott | 260—123.5 X |
| 2,615,905 | 10/1952 | Forstmann et al. | 99—17 |
| 3,173,792 | 3/1965 | Mustakas et al. | 260—123.5 X |
| 3,392,026 | 7/1968 | Mustakas et al. | 99—2 |
| 3,560,217 | 2/1971 | Young et al. | 260—123.5 X |
| 3,615,648 | 10/1971 | Barros | 260—123.5 X |
| 2,588,392 | 3/1952 | Julian et al. | 260—123.5 |

OTHER REFERENCES

Chem. Abstracts, 1964, 6274g, Pokorny et al.
Chem. Abstracts, vol. 63, 1965, 6246e–g, Pokorny et al.
Chem. Abstracts, vol. 67, 1967, 115955r, Pokorny et al.
Chem. Abstracts, vol. 73, 1970, 2724v, Ballester et al.

HOWARD E. SCHAIN, Primary Examiner

U.S. Cl. X.R.

99—2 E, 17